United States Patent [19]
Wilson et al.

[11] Patent Number: 5,295,655
[45] Date of Patent: Mar. 22, 1994

[54] FLUSH VALVE FLOW CONTROL RING

[75] Inventors: John R. Wilson, Naperville; Peter Golen, Chicago, both of Ill.

[73] Assignee: Sloan Valve Company, Franklin Park, Ill.

[21] Appl. No.: 52,743

[22] Filed: Apr. 27, 1993

[51] Int. Cl.5 .................. F16K 31/385; F16K 31/145
[52] U.S. Cl. ........................ 251/40; 251/38; 251/120; 251/123
[58] Field of Search ............... 251/40, 38, 120, 123

[56] References Cited

U.S. PATENT DOCUMENTS

| | | | |
|---|---|---|---|
| 4,202,525 | 5/1980 | Govaer et al. | 251/40 |
| 4,327,891 | 5/1982 | Allen et al. | 251/38 |
| 5,013,007 | 5/1991 | Whiteside | 251/40 |
| 5,150,877 | 9/1992 | Whiteside et al. | 251/40 |

Primary Examiner—Martin P. Schwadron
Assistant Examiner—Kevin L. Lee
Attorney, Agent, or Firm—Kinzer, Plyer, Dorn, McEachran & Jambor

[57] ABSTRACT

A toilet device flush valve has a body with an inlet and an outlet and a valve seat in the body positioned therebetween. There is a movable diaphragm which closes upon the valve seat to control flow between the inlet and the outlet. A piston is attached to the movable diaphragm and there is a flow control ring mounted on the piston. The flow control ring includes water passages forming the sole flow path between the inlet and the outlet when the piston is in the open position. The passages on the flow control ring are sized to correspond to the desired flow rate through the flush valve. The passages extend in a direction to give the water flowing therethrough both axial and circumferential components to dissipate power in the water flowing through the flush valve to provide a relatively constant flow rate which is independent of the water pressure applied at the flush valve inlet.

23 Claims, 2 Drawing Sheets

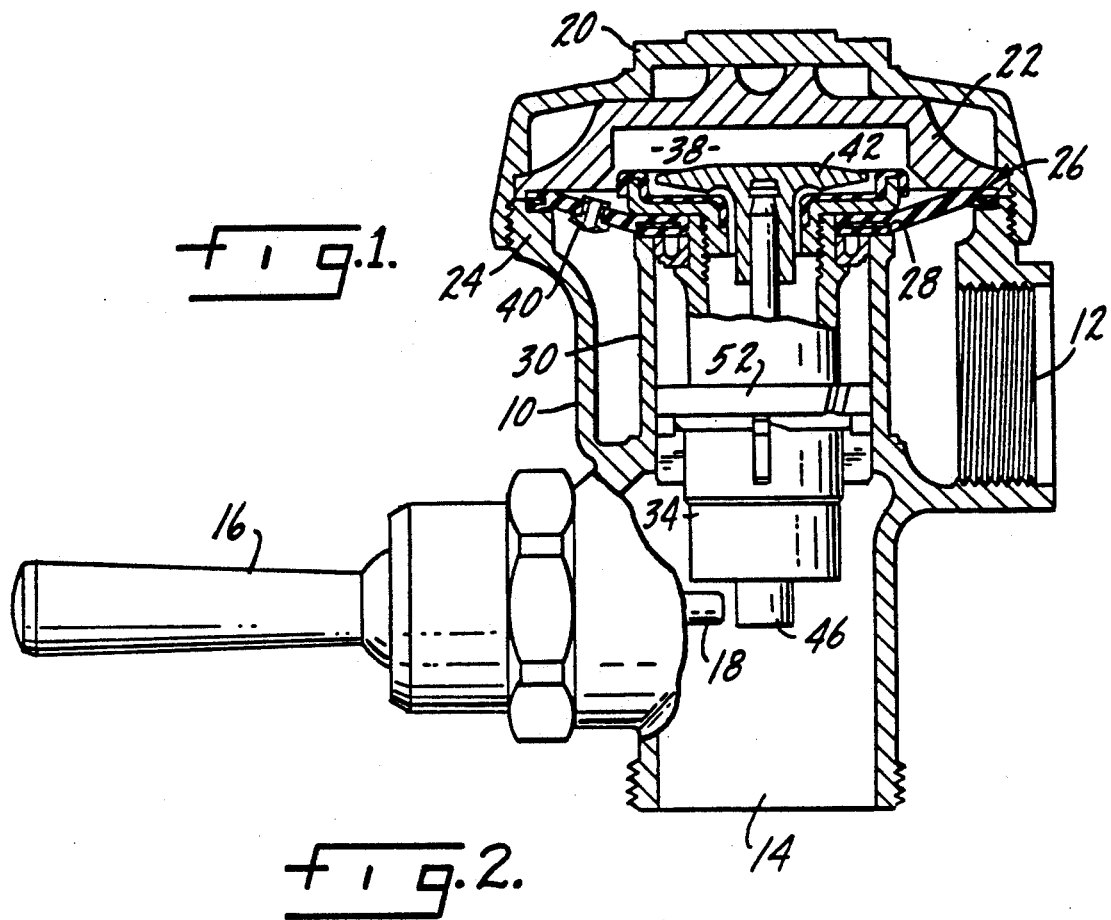
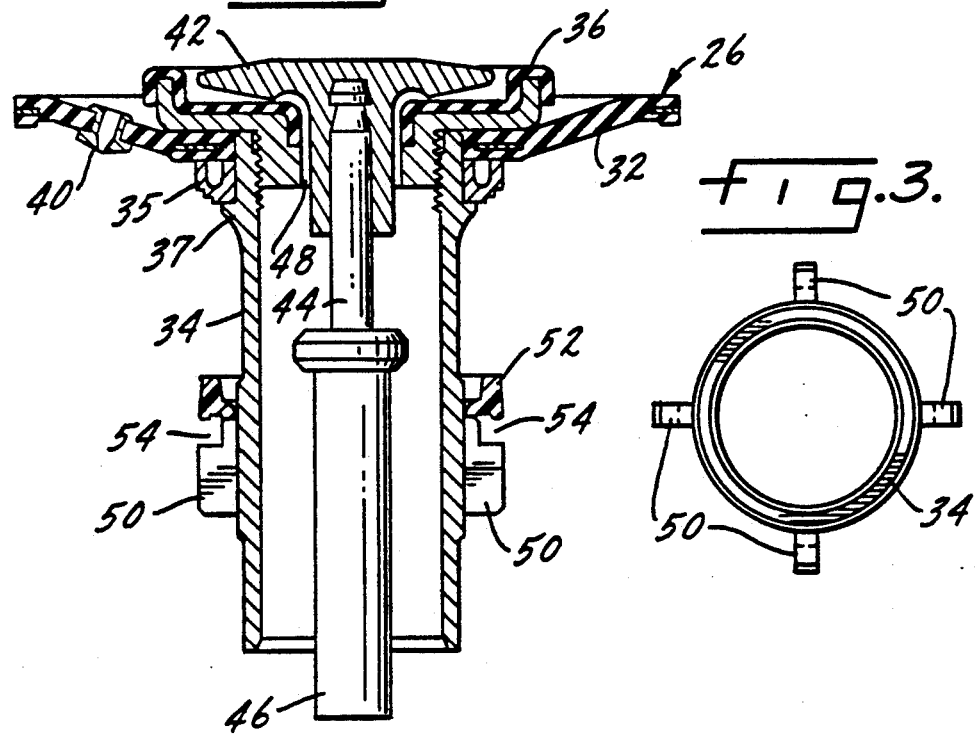

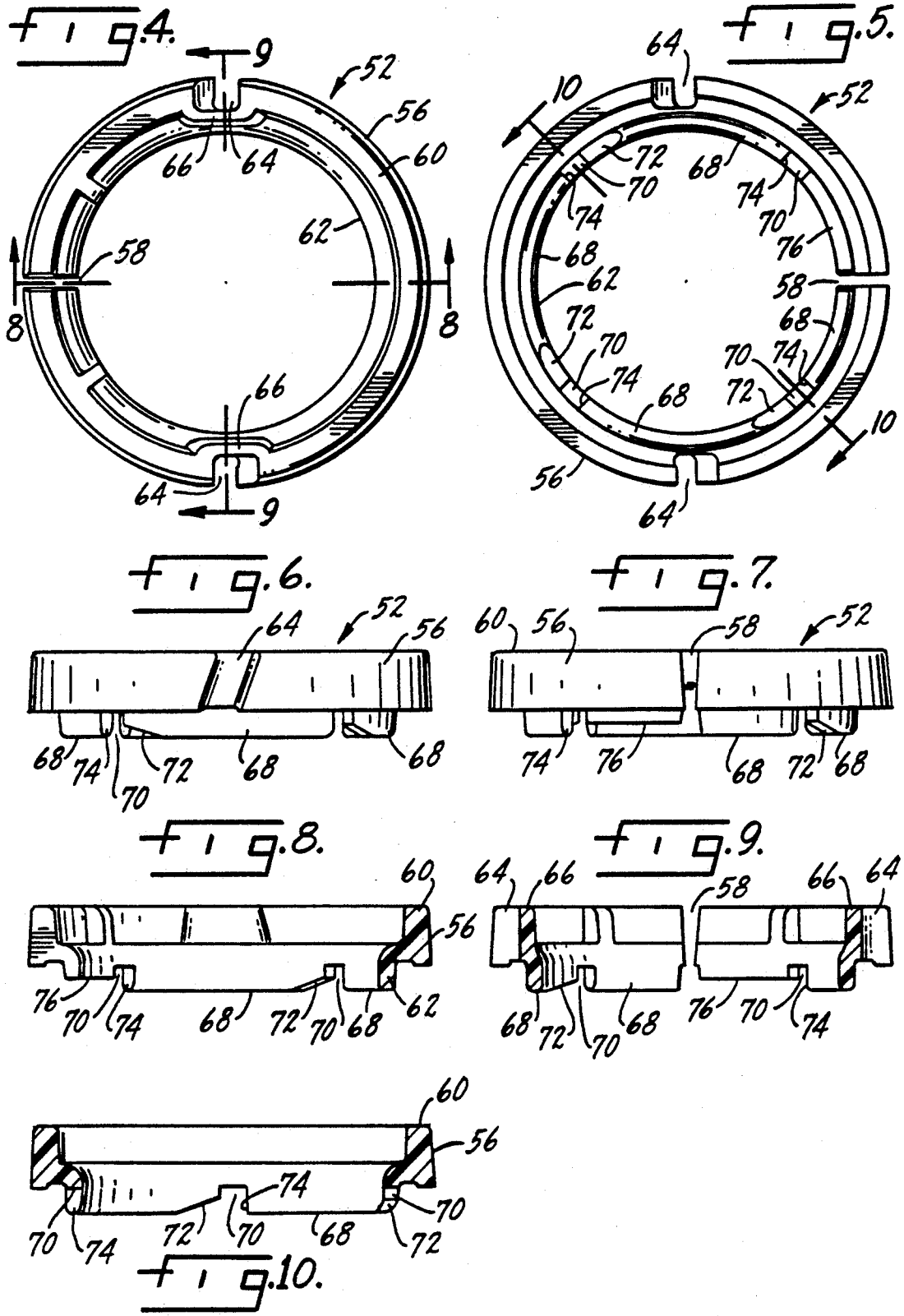

FLUSH VALVE FLOW CONTROL RING

THE FIELD OF THE INVENTION

The present invention relates to flush valves for use in toilet devices such as urinals and water closets and is particularly directed to a flow control ring having water passages which form the sole connection between the inlet and outlet when the flush valve is open. Different parts of the United States have municipal codes which vary in the permitted flow rate through commercial toilet devices and in fact the flow rates are dissimilar for urinals and water closets. The present invention is particularly concerned with a flow control ring which provides tight control over flow rate to meet municipal codes and yet provides a means for changing the flow rate to comply with differing municipal codes and for the variation in flow rates between urinals and water closets.

SUMMARY OF THE INVENTION

The present invention relates to flush valves for toilet devices and particularly to a flow control ring for closely regulating the flow rate through the flush valve to comply with varying municipal codes.

A primary purpose of the invention is a flush valve control ring having flow control passages which are sized in accordance with the desired flow rate through the valve.

Another purpose is a flow control ring for use on a flush valve of the type described in which the water passages are so directed as to cause the water flowing between a flush valve inlet and outlet to have both axial and circumferential components to dissipate water power providing thereby a relatively constant flow rate independent of water pressure applied to the flush valve.

Another purpose is a flow control ring for a flush valve having a plurality of circumferentially and axially directed water passages on the exterior thereof.

Another purpose is a flow control ring as described including cooperating means on the ring and the associated flush valve piston to both mount and correctly locate the flow control ring.

Another purpose is a flow control ring which is movably mounted upon the flush valve piston and includes locating devices which will respond to water flow through the flush valve to properly position the ring on the flush valve piston.

Another purpose is a replaceable flow control ring for use in flush valves of the type described which has flow control passages which may be varied in accordance with the desired flow rate.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, through a flush valve of the type described;

FIG. 2 is an axial section through the diaphragm assembly;

FIG. 3 is a bottom view of the piston guide of FIG. 2;

FIG. 4 is an enlarged top view of the flow control ring;

FIG. 5 is an enlarged bottom view of the flow control ring;

FIG. 6 is a side view of the flow control ring illustrating one of the flow control notches;

FIG. 7 is a side view of the flow control ring illustrating the ring split opening;

FIG. 8 is a section along plane 8—8 of FIG. 4;

FIG. 9 is a section along plane 9—9 of FIG. 4; and

FIG. 10 is a section along plane 10—10 of FIG. 5.

DESCRIPTION OF THE PREFERRED EMBODIMENT

The present application relates to diaphragm-type flush valves of the type illustrated in U.S. Pat. No. 4,327,891 and sold by the assignee of the present application, Sloan Valve Company of Franklin Park, Ill., under the trademark ROYAL. Such valves are in widespread use throughout the United States. The invention is particularly concerned with controlling the flow rate through the flush valve to meet municipal codes. Such codes limit, within close tolerances, the flow rate for toilet devices such as urinals and water closets and in fact the flow rate is different for each such device. Further, municipalities will differ as to the permitted flow rate. The present invention is particularly concerned with a flow control ring which is mounted within the flush valve and which serves as the means for controlling the flow of water through the flush valve. Not only does the ring control the flow of water by limiting the size of the water passages, but the ring is formed and adapted to dissipate power in the water flowing through the valve which has the effect of providing a relatively constant flow rate independent of the water pressure applied to the valve.

FIG. 1 illustrates a flush valve of the type described in the '891 patent. There is a generally hollow body 10 which has an inlet connection 12 and an outlet connection 14. A handle assembly 16 controls movement of a plunger 18 which is the operating element for the flush valve. Although the invention will be described in connection with a manually operated valve, the flow control element disclosed herein is equally applicable to automatically operated valves such as those sold by Sloan Valve Company utilizing electric solenoids for valve actuation. The top of body 10 is closed by an outer cover 20. There is an inner cover 22 which is held by the outer cover 20 on top of an upper flange 24 of the body 10. A diaphragm assembly 26 is located between the flange and the inner cover 22. The diaphragm assembly, as illustrated in FIG. 1, is closed upon a valve seat 28 formed at the upper end of the barrel 30 which forms a portion of the discharge waterway for the flush valve.

The diaphragm assembly 26 includes a diaphragm 32 and a piston or guide 34 attached to the diaphragm by a piston disc 36. A refill ring 35 is held between a shoulder 37 on the piston and the underside of the diaphragm. The diaphragm has a central opening which permits communication between a chamber 38, above the diaphragm and inside of inner cover 22, and the flush valve discharge 14. As is known in the art, pressure in chamber 38 supplied from inlet 12 through a bypass 40 keeps the diaphragm in the closed position of FIG. 1. The diaphragm assembly further includes a relief valve 42 having a rod 44 slidably mounting a sleeve 46 which is in position to be contacted by plunger 18. In the conventional operation of the valve, inward movement of the plunger tilts the relief valve, permitting water within chamber 38 to vent through opening 48 in piston disc 36. Venting of this pressure will cause the diaphragm to raise up away from its seat 28, thereby connecting inlet pressure 12 with the interior of barrel 30 so that water may pass through the flush valve.

Piston 34 has a plurality of outwardly extending lugs 50 which support a flow control ring 52 illustrated in detail in FIGS. 4 through 10. All water flowing through barrel 30 will pass through the flow control ring 52 and the size of the openings or passages in this ring will determine the volume of water which will pass through the flush valve during the period that the diaphragm is off of its seat 28. In this connection, in normal operation of the diaphragm, as soon as it has raised off of its seat, chamber 38 will again begin to fill as water passes through bypass orifice 40. The time that the valve is actually open is determined by the time it takes water to pass through bypass orifice 40 and create sufficient pressure in chamber 38 to close the diaphragm upon its seat.

As described herein, the flow control ring is a split ring and it is a separate element from its supporting piston. It is within the scope of the invention to have a solid or unbroken refill ring which may be an integral part of the piston, as what is important is the ring and the size, location and construction of the water passages in it which regulates the flow of water through the flush valve.

As illustrated particularly in FIGS. 2 and 3, the lugs 50 on piston 34 are equally spaced and four in number. The invention should not be so limited. Each of the lugs has an outwardly-facing notch 54 which will serve to locate the flow control ring on the lugs.

The flow control ring, shown particularly in FIGS. 4–10, includes a body 56 which is formed into a split ring by a gap 58. The ring is split so that it may be mounted upon the piston. As shown particularly in FIG. 8, body 56 has an upwardly-extending portion 60 which will be positioned slightly outwardly from the exterior of piston 34 and an inner portion 62 which will fit closely upon the exterior of piston 34 to prevent any measurable volume of water from flowing between the outer surface of the piston and the inner surface of the ring. The exterior of the ring is sized relative to the interior of barrel 30 to prevent water flow therebetween. All of the water flowing past the flow control ring will pass through the pair of diametrically opposed outer notches or passages 64. The passages are formed within the body 56, outwardly of the inner portion 62, and as shown particularly in FIG. 6, are slanted relative to the axis of the piston and ring. The passages have what may be termed an axial and a circumferential component of direction with the result that the water passing through the passages will tend to swirl or be turbulent, such that some of the power of the moving water will be dissipated. This dissipation of power along with the closely controlled size of passages 64 will provide a relatively constant volume of water flow independent of water pressure at inlet 12. It should be noted that directly behind each of notches 64 the flow control ring has a thickened or reinforced area 66 to assist in maintaining integrity of the ring when assembled and in use.

In order to properly position the flow control ring upon lugs 50, the inner portion 62 of the ring includes a plurality of downwardly extending arcuate tabs 68, there being four such tabs in the illustrated embodiment. There are gaps 70 between the tabs and each tab has a ramp or cam surface 72 and a generally flat vertical surface 74. When properly positioned, the lugs 50 will extend into the gaps 70. Since the ring is loosely mounted upon the piston, there is the possibility that it may not be properly seated, either at installation or at some subsequent time during use. Water flowing through the slanted passages 64 will tend to make the ring turn and such turning will take place until ramp surfaces 72 direct the upper ends of lugs 50 into ring gaps 70. Thus, the swirling of the water as it passes through the flow control ring may cause the ring to turn, but the construction of the arcuate tabs in cooperation with lugs 50 will insure that the turning ring will be seated in the appropriate location within a short time after water begins to pass through the ring.

One of the tabs 68, shown particularly in FIG. 9 and indicated at 76, which is directly adjacent gap 58, is shorter in arcuate extent and does not have a ramp. Tab 76, because of its shortened circumferential dimension, prevents the ring from being hung up on lugs 50 and insures that the ring will properly seat in notches 54. When the ring is so seated, gap 58 will be midway between a pair of adjacent lugs 50. This is important as water pressure applied to the flow control ring is substantial and the opposite cantilever ends of the ring adjacent gap 58 need support. This support is provided by centering the gap between adjacent lugs. This not only insures support to maintain integrity of the ring, but prevents one or both of the ring arms adjacent the gap from being bent to the point where substantial water would flow through the gap, thus degrading the function of the ring and its passages 64 in tightly controlling the volume of water flowing through the flush valve. In this connection, it is possible by use of the flow control ring as disclosed herein, to control water flow to within ±1 gal. at inlet water pressures from 20 to 80 psi.

Although the flow control passages have been shown as being on the exterior of the ring, they could also be on the interior. Likewise, the passages need not be slanted, although such are clearly advantageous in terms of dissipating power within the water to maintain flow rate regardless of pressure. What is important is to provide a flow control ring which cooperates with the piston in such a way as to insure the entire flow of water is through the passages in the ring and that those passages be held to very close tolerance in terms of the cross sectional area through which water flows. In this way it is possible to meet municipal codes as to water flow and to maintain the close tolerances in terms of water flow that such codes require. To accommodate different water flow requirements, the refill rings may be made with different size passages.

Whereas the preferred form of the invention has been shown and described herein, it should be realized that there may be many modifications, alterations and substitutions thereto.

The embodiments of the invention in which an exclusive property or privilege is claimed are defined as follows:

1. A diaphragm flow control assembly for a toilet device flush valve including a diaphragm reciprocal between a water flow position and a closed position, a piston attached to the diaphragm, a flow control ring carried by said piston, said flow control ring having flow control passages therein through which all water passes when said diaphragm and piston are in the water flow position, said flow control passages having a direction which forms an acute angle with the axis of said piston and being formed to dissipate power of the water flowing through said flow control assembly whereby said flow control assembly provides a relatively constant flow rate which is independent of water pressure applied thereto.

2. The flow control assembly of claim 1 further characterized in that said passages direct water flowing therethrough in a path which is both axial and circumferential in direction.

3. The flow control assembly of claim 2 further characterized in that said passages have a combined flow area determined by the desired flow rate through said flow control assembly.

4. The flow control assembly of claim 1 further characterized in that said flow control passages are formed by a plurality of notches on said ring.

5. The flow control assembly of claim 4 further characterized in that said notches are on the exterior of said ring.

6. The flow control assembly of claim 5 further characterized in that there are a pair of said notches located at diammetrically opposed positions on the exterior of said ring.

7. The flow control assembly of claim 1 further characterized in that said flow control ring is loosely mounted on said piston.

8. A flow control ring for mounting on a movable valve element to control water flow through a toilet device flush valve, said ring having flow control passage means therein, the size of which being determined by the desired flow rate through the toilet device flush valve, said ring being movable relative to the valve element and having locating means thereon which cooperate with portions on the movable valve element to insure a predetermined relationship for said passage means relative to the movable valve element.

9. The ring of claim 8 further characterized in that said passages include a plurality of notches in said ring which extend at least in part in the direction of the ring axis.

10. The ring of claim 9 further characterized in that said notches are on the exterior of said ring.

11. The ring of claim 8 further characterized in that said locating means include a plurality of circumferentially extending tabs, each of which has a ramp surface at one end thereof.

12. A diaphragm flow control assembly for a toilet device flush valve including a diaphragm, a piston attached thereto, said diaphragm and piston being reciprocal between a water flow position and a closed position, a flow control ring on said piston, said flow ring having flow control passages therein through which all water passes when said diaphragm and piston are in the water flow position, said ring being movably mounted on said piston with said ring and piston having cooperating locating means thereon which insure a predetermined relationship for said passages relative to said piston.

13. The flow control assembly of claim 12 further characterized in that said passages are formed by a plurality of notches on the exterior of said ring.

14. The flow control assembly of claim 13 further characterized in that said notches direct water flowing therethrough in a path which is both axial and circumferential in direction relative to said piston.

15. The flow control assembly of claim 12 further characterized in that said locating means includes a plurality of outwardly extending support lugs on said piston and a plurality of circumferential tabs on said ring.

16. The flow control assembly of claim 15 further characterized by and including a plurality of openings on said ring between said tabs, with said support lugs being positioned within said openings when said ring is located on said piston.

17. The flow control assembly of claim 16 further characterized in that at least some of said tabs have a ramp surface positioned to contact a lug for use in locating said ring upon said lug.

18. The flow control assembly of claim 16 further characterized in that said ring is a split ring with the split being located midway between piston lugs.

19. A toilet device flush valve including a body having an inlet and an outlet, a valve seat in said body, a movable diaphragm for closing upon said valve seat to control flow between said inlet and outlet, a piston attached to and movable with said diaphragm, a flow control ring on said piston, said flow control ring including water passage means forming the sole flow path between said inlet and outlet when said piston is away from said valve seat, the water flowing through said passages moving in a direction forming an acute angle with the axis of said piston, said passage means having a flow area determined by the desired flow rate of said flush valve.

20. The flush valve of claim 19 further characterized in that said passage means are formed to dissipate power of the water flowing through said flush valve whereby said flow control ring provides a relatively constant flow rate which is independent of water pressure applied at said flush valve inlet.

21. The flush valve of claim 19 further characterized in that said passage means include a plurality of notches on the exterior of said flow control ring, said notches extending at least in part, in the direction of said piston axis.

22. The flush valve of claim 19 further characterized by and including cooperating locating means on said ring and piston to insure a predetermined relationship for said passages relative to said piston.

23. The flush valve of claim 22 further characterized in that said locating means includes a plurality of outwardly-extending support lugs on said piston and a plurality of circumferentially extending tabs on said flow control ring.

* * * * *